US011965442B2

(12) United States Patent
Lee et al.

(10) Patent No.: US 11,965,442 B2
(45) Date of Patent: Apr. 23, 2024

(54) SOUND MITIGATION FOR A DUCT

(71) Applicant: Toyota Motor Engineering & Manufacturing North America, Inc., Plano, TX (US)

(72) Inventors: Taehwa Lee, Ann Arbor, MI (US); Xiaopeng Li, Ann Arbor, MI (US); Ziqi Yu, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 17 days.

(21) Appl. No.: 17/829,969

(22) Filed: Jun. 1, 2022

(65) Prior Publication Data

US 2023/0392527 A1 Dec. 7, 2023

(51) Int. Cl.

*F01N 1/02* (2006.01)
*G10K 11/16* (2006.01)
*G10K 11/172* (2006.01)

(52) U.S. Cl.

CPC ............ *F01N 1/023* (2013.01); *G10K 11/161* (2013.01); *G10K 11/172* (2013.01)

(58) Field of Classification Search

CPC .... F01N 1/023; F01N 1/026; F01N 2490/155; F02M 35/1266; G10K 11/161; G10K 11/172

See application file for complete search history.

(56) References Cited

U.S. PATENT DOCUMENTS 4,327,817 A * 5/1982 Scarton .................... F01N 1/003 181/296
6,983,820 B2 * 1/2006 Boast .................. F16L 55/0335 181/243
6,988,057 B2 1/2006 Huang et al.
7,278,514 B1 10/2007 Quigley
7,293,627 B2 11/2007 Kruger et al.
7,448,469 B2 11/2008 Seyler et al.
7,556,123 B2 7/2009 Ido et al.
(Continued)

FOREIGN PATENT DOCUMENTS

DE 732733 C * 3/1943
EP 1375848 A1 * 1/2004 ............. F01N 1/003
(Continued)

OTHER PUBLICATIONS

Selamet, A. et al., "Helmholtz resonator lined with absorbing material," J. Acoust. Soc. Am. 117 (2), Feb. 2005, pp. 725-733.
(Continued)

*Primary Examiner* — Jeremy A Luks

(74) *Attorney, Agent, or Firm* — Christopher G. Darrow; Darrow Mustafa PC

(57) ABSTRACT

A duct includes a duct body defining an inlet, an outlet, and a channel connecting the inlet and the outlet. The duct body also defines an upstream resonator. The upstream resonator includes an upstream annular cavity external to the channel and an annular perforated plate coplanar with the upstream annular cavity. The duct body further defines a downstream resonator. The downstream resonator includes a downstream annular cavity external to the channel and an annular neck coplanar with the downstream annular cavity.

20 Claims, 2 Drawing Sheets

(56) References Cited

U.S. PATENT DOCUMENTS

| | | | | |
|---|---|---|---|---|
| 8,087,493 | B2 | 1/2012 | Kempf et al. | |
| 8,408,357 | B2 | 4/2013 | Cheung | |
| 9,010,485 | B2 * | 4/2015 | Bornemann | F02M 35/1266 123/184.57 |
| 9,121,374 | B2 * | 9/2015 | Denker | F16L 55/0331 |
| 9,625,077 | B2 * | 4/2017 | Barbolini | F16L 55/033 |
| 10,386,065 | B2 * | 8/2019 | Liu | F02C 7/24 |
| 10,900,449 | B2 * | 1/2021 | Shin | F02M 35/1216 |
| 2005/0252716 | A1 * | 11/2005 | Moenssen | F02M 35/1266 181/219 |
| 2011/0074067 | A1 * | 3/2011 | Khami | F02M 35/10104 264/513 |
| 2016/0097315 | A1 | 4/2016 | Becker et al. | |
| 2020/0066245 | A1 * | 2/2020 | Lee | G10K 11/172 |
| 2020/0088144 | A1 * | 3/2020 | Sánchez | B29C 66/131 |
| 2020/0284529 | A1 * | 9/2020 | Lee | F01N 1/023 |
| 2021/0301965 | A1 * | 9/2021 | Lee | F16L 55/0335 |

FOREIGN PATENT DOCUMENTS

| | | | | |
|---|---|---|---|---|
| JP | 2007192262 | A | 8/2007 | |
| JP | 4115021 | B2 * | 7/2008 | F16L 55/02 |
| JP | 2020070954 | A | 5/2020 | |
| KR | 20140082113 | A | 7/2014 | |

OTHER PUBLICATIONS

Wang, X. et al., "Wave propagation in a duct with a periodic Helmholtz resonators array," J. Acoust. Soc. Am. 131 (2), Feb. 2012, pp. 1172-1182.

Lee et al., U.S. Appl. No. 18/113,298, filed Feb. 23, 2023.

* cited by examiner

FIG. 3A
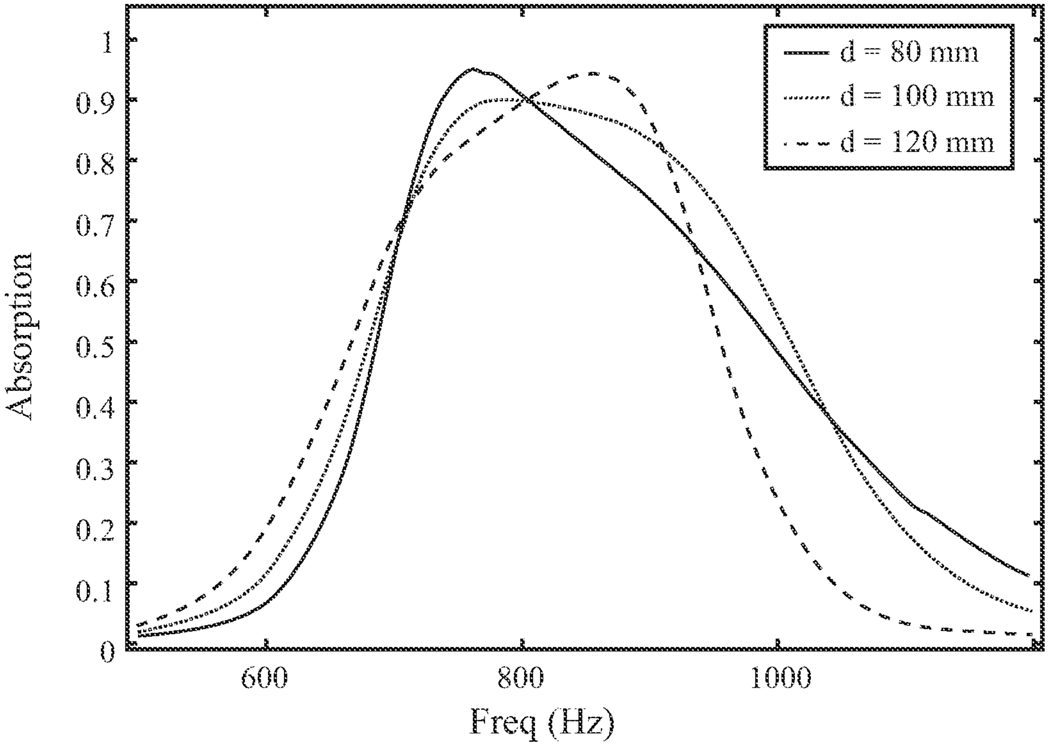
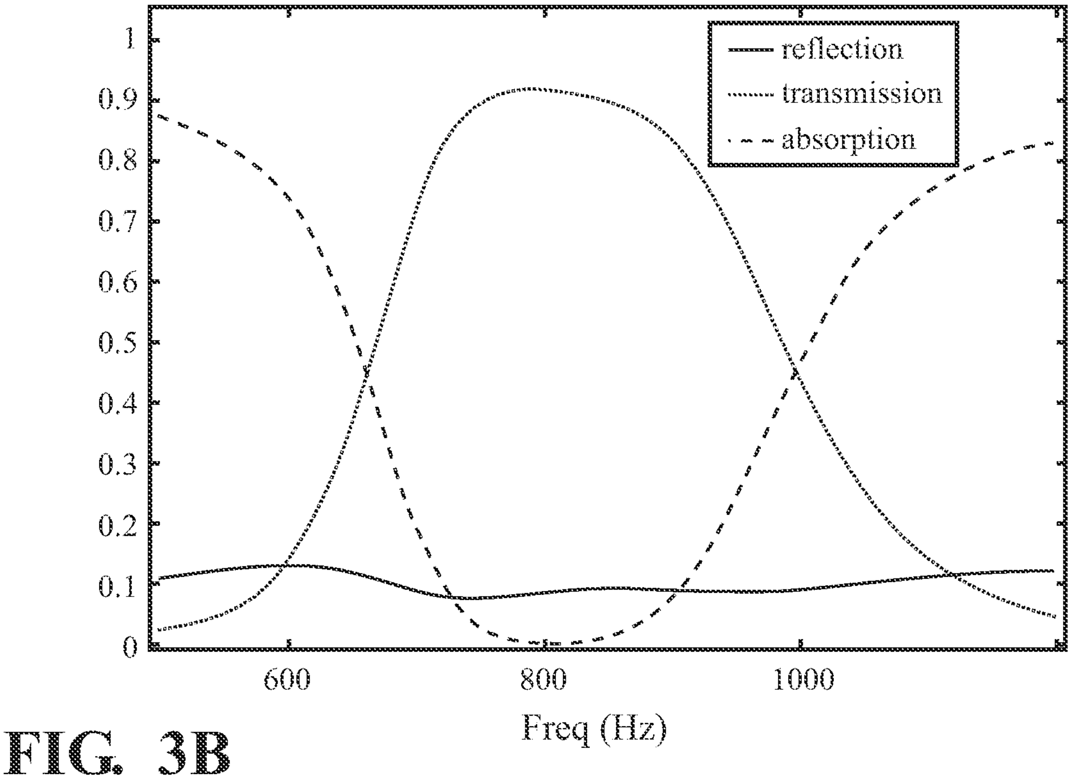
FIG. 3B

SOUND MITIGATION FOR A DUCT

TECHNICAL FIELD

The subject matter described herein relates, in general, to systems and methods for sound mitigation and, more specifically, to sound mitigation within a duct.

BACKGROUND

The background description provided is to present the context of the disclosure generally. Work of the inventor(s), to the extent it may be described in this background section, and aspects of the description that may not otherwise qualify as prior art at the time of filing, are neither expressly nor impliedly admitted as prior art against the present technology.

Ducts or other types of suitable piping may be used for directing and transporting air or any other type of gas from one location to another. In some examples, ducts can take a variety of different shapes and can be in the form of tubes, pipes, or other types of conduits. Ducts have numerous uses such as heating, ventilating, and air conditioning (HVAC) systems, plumbing systems, vehicular systems, etc.

However, noise may be generated by the movement of air or gas within the duct. This noise may be generated by vibrations caused by the movement of the air or gas as it passes through the duct and/or may be caused by the source of the air or gas, such as an engine of a vehicle. Mufflers, such as vehicle mufflers, have been developed to reduce the noise by reducing the sound pressure emitted by the operation of the engine. For example, common vehicle mufflers generally include a resonator that acts as an echo chamber by reducing the overall noise volume of the engine by canceling sound waves.

SUMMARY

This section generally summarizes the disclosure and is not a comprehensive explanation of its full scope or all its features.

In one embodiment, a duct includes a duct body that defines an inlet, an outlet, and a channel connecting the inlet and the outlet, as well as an upstream and downstream resonator. The upstream resonator includes an upstream annular cavity external to the channel and an annular perforated plate coplanar with the upstream annular cavity. The downstream resonator includes a downstream annular cavity external to the channel and an annular neck coplanar with the downstream annular cavity.

In another embodiment, a sound mitigating system for a duct includes an upstream resonator and a downstream resonator. The duct includes a duct body defining an inlet, an outlet, and a channel connecting the inlet and the outlet. The upstream resonator is configured to be connected to the duct body external to the channel and includes an upstream annular cavity and an annular perforated plate coplanar with the upstream annular cavity. The downstream resonator is configured to be connected to the duct body external to the channel and includes a downstream annular cavity and an annular neck coplanar with the downstream annular cavity.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 3A illustrates an example of absorption spectra of the duct of FIGS. 1 and 2 for various distances between the upstream resonator and the downstream resonator.

FIG. 3B illustrates an example of reflection, transmission, and absorption spectra of the duct of FIGS. 1 and 2.

DETAILED DESCRIPTION

Described are systems for mitigating sound within a duct. In one example, the system for mitigating sound includes a duct having a duct body defining an inlet, an outlet, a channel connecting the inlet and the outlet, an upstream resonator, and a downstream resonator. The upstream resonator includes an upstream annular cavity external to the channel and an annular perforated plate coplanar with the upstream annular cavity. The downstream resonator includes a downstream annular cavity external to the channel and an annular neck coplanar with the downstream annular cavity. In one embodiment, the upstream resonator and the downstream resonator are defined by the duct body. In another embodiment, the upstream resonator and the downstream resonator are configured to be attached to the duct body. In either arrangement, the upstream resonator and the downstream resonator may create resonance coupling in order to reflect and/or absorb sound waves traveling through the duct to mitigate noise within the duct.

Figure 1:
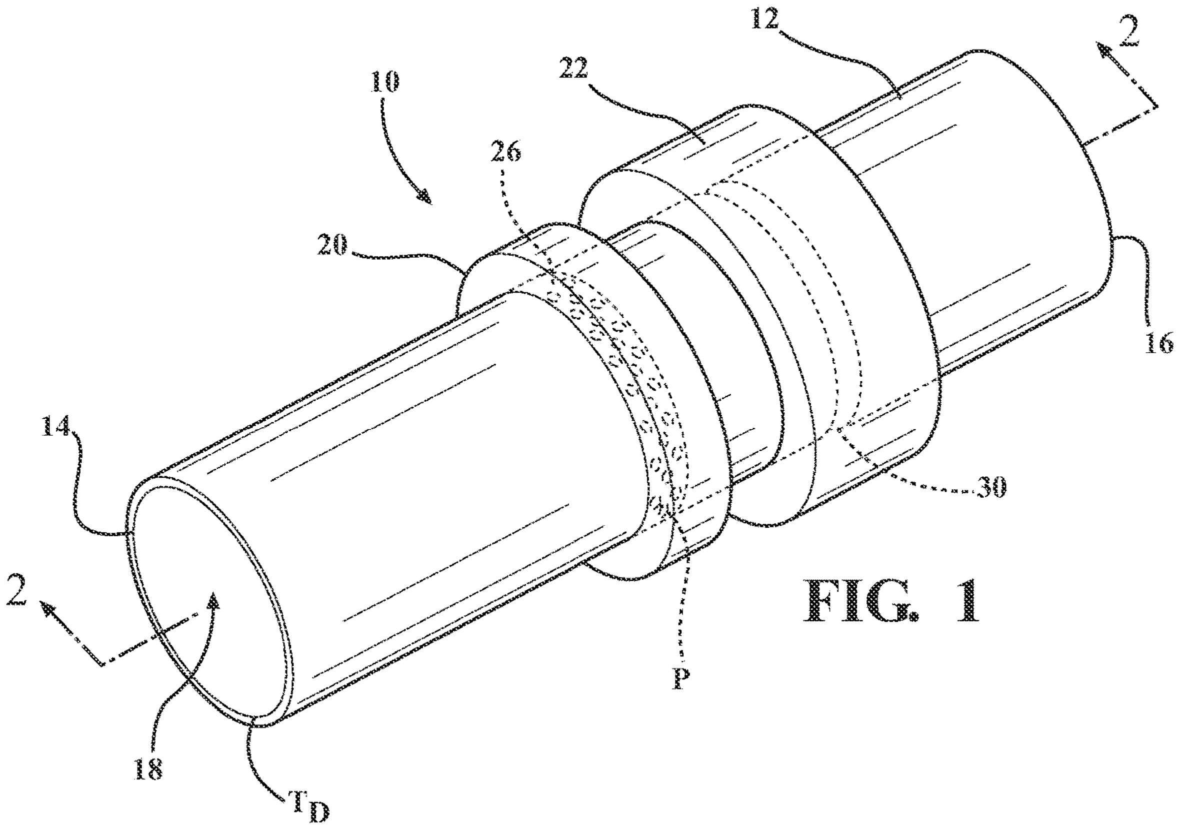
FIG. 1 illustrates an example of a duct including a duct body defining an inlet, an outlet, a channel connecting the inlet and the outlet, an upstream resonator, and a downstream resonator.

Referring to FIG. 1, an example of a duct 10 is shown. The duct 10 may be any kind of duct and may be configured for directing the flow of air or any other type of gas. In some instances, the duct 10 can be a component of a heating, ventilating, and air conditioning (HVAC) system. In other instances, the duct 10 can be a muffler for a vehicle that is used to reduce the sound created by an engine of the vehicle. Regardless of the application, the duct 10 may be configured to mitigate sound created by air or other gas flowing through the duct 10. For example, the duct 10 can absorb sound waves traveling through the duct 10 and/or can reflect sound waves traveling through the duct 10 in order to mitigate noise within the duct 10.

The duct 10 and its components, described in further detail below, can be formed in any suitable manner. For example, the duct 10 can be unitarily formed as a single piece by 3D printing, injection molding, polymer casting, rotational molding, vacuum forming, blow molding, extrusion, and/or any other suitable method. In other instances, the duct 10 can be formed from multiple components connected together. The components can be made using the aforementioned methods and can be connected together by adhering, welding, and/or any other suitable method. The duct 10 can be formed from any suitable material, for example, from metal, plastic, etc.

Figure 2:
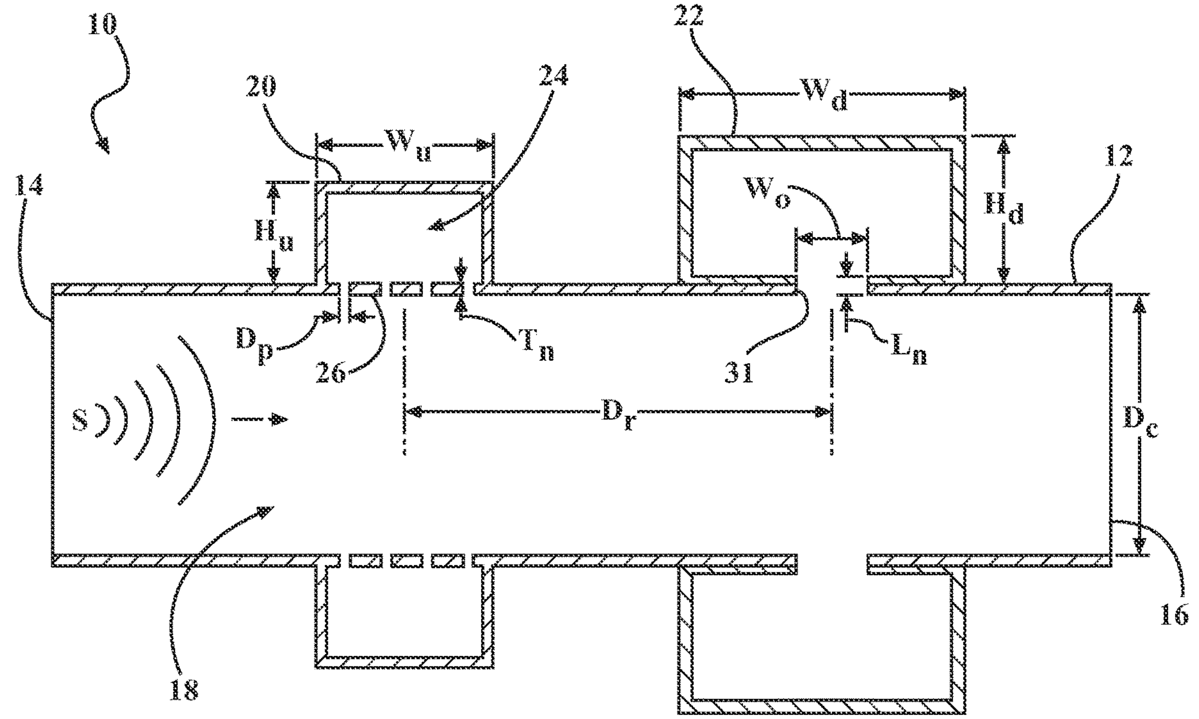
FIG. 2 illustrates a cross-sectional view of the duct of FIG. 1 generally taken along lines 2-2.

With continued reference to FIG. 1, the duct 10 includes a duct body 12, which may form an elongated tube-like component of the duct and may define an inlet 14, an outlet 16, and a channel 18 fluidly connecting the inlet 14 and the outlet 16. Within the channel 18, air or other types of gas may flow through the duct body 12 from the inlet 14 to the outlet 16. Accordingly, the inlet 14 is located upstream of the outlet 16. The duct body 12 can define a thickness $T_D$, and the channel 18 may define a diameter $D_c$, as shown in FIG. 2.

The duct 10 also includes an upstream resonator 20 and a downstream resonator 22. The upstream resonator 20 and the downstream resonator 22 may be configured to mitigate sound within the duct 10. For example, the upstream resonator 20 and the downstream resonator 22 may be configured to absorb and/or reflect sound waves S traveling within channel 18. The upstream resonator 20 is located upstream of the downstream resonator 22 (e.g., closer to the inlet 14 than the downstream resonator 22), and the downstream resonator 22 is located downstream of the upstream resonator 20 (e.g., closer to the outlet 16 than the upstream resonator 20).

In one embodiment, the upstream resonator 20 and/or the downstream resonator 22 may be defined by the duct body 12 such that the upstream resonator 20 and/or the downstream resonator 22 are unitarily formed with the duct body 12, as described above. In other embodiments, the upstream resonator 20 and/or the downstream resonator 22 may be formed as separate components from the duct body 12 and can be configured for attachment to the duct body 12, as described above.

The upstream resonator 20 is shown to be unitarily formed with the duct body 12. The downstream resonator 22 is configured as a separate component attached to the duct body 12. However, in other arrangements, the upstream resonator 20 may be configured as a separate component attached to the duct body 12 and/or the downstream resonator 22 may be unitarily formed with the duct body 12. Moreover, as shown, the upstream resonator 20 and the downstream resonator 22 surround the duct body 12 annularly along its circumference. However, in other instances, the upstream resonator 20 and/or the downstream resonator 22 may only partially surround the duct body 12.

Referring to FIG. 2, which illustrates a cutaway view of the duct 10 generally taken along lines 2-2 of FIG. 1, illustrates that sound waves S produced or otherwise introduced into the channel 18 may travel in a direction from the inlet 14 to the outlet 16. As mentioned previously, the sound waves S may be undesirable. As such, in some arrangements, the upstream resonator 20 is a lossy resonator. In other words, the upstream resonator 20 can be configured to absorb sound waves S.

The upstream resonator 20 may include an upstream annular cavity 24 that may be located external to the channel 18. The upstream annular cavity 24 may define a height $H_u$, a width $W_u$, as well as a volume $V_u$. In this example, the upstream annular cavity 24 essentially wraps around a portion of the duct 12 to define the volume $V_u$.

In some instances, the height $H_u$ of the upstream resonator 20 may be smaller than the diameter of the channel 18 $D_c$, and in other instances, the height $H_u$ of the upstream resonator 20 may be greater than the diameter of the channel 18 $D_c$. The upstream resonator 20 also includes an annular perforated plate 26 that may be configured to fluidly connect the channel 18 and the upstream annular cavity 24. The annular perforated plate 26 may be unitarily formed with the duct body 12 or may be a separate component configured for attachment to the duct body 12 and can be formed from the same material as the duct body 12 or a different material. The annular perforated plate 26 can be coplanar with the upstream annular cavity 24 and may have a width equal to or less than the width $W_u$.

The annular perforated plate 26 can define a plurality of perforations P (e.g., holes). The perforations P can be generally circular in shape, or the perforations P can be any other suitable shape. The annular perforated plate 26 can include any suitable number of perforations P, and the perforations P can surround the circumference of the duct 10 or only partially surround the circumference of the duct 10. The perforations P can define a perforation diameter $D_p$. The perforations P can each have substantially the same diameter $D_p$, or the perforations P can have different diameters. In some instances, the annular perforated plate 26 may be unitarily formed with the duct body 12, and the perforations may be formed within the duct body 12 by any suitable method, such as drilling out the perforations P. In other instances, the annular perforated plate 26 may be formed as a separate component from the duct body 12 and then connected to the duct body 12 in any suitable manner.

The annular perforated plate 26 can define a thickness $T_n$, a perforation diameter $D_p$ of the perforations, and a porosity $\sigma$ of the perforations. In some instances, the thickness $T_n$ can be substantially equal to the thickness $T_D$ of the duct body 12. In other instances, the thickness $T_n$ can be less than or greater than the thickness $T_D$ of the duct body 12. The porosity $\sigma$ may be defined by the following equation, where $A_{perforations}$ is the total area of the perforations P, and where $A_{plate}$ is the total area of the annular perforated plate 26:

$$\sigma = \frac{A_{perforations}}{A_{plate}}.$$

The absorption of the upstream resonator 20 may be a function of the volume $V_u$, the thickness $T_n$ of the annular perforated plate 26, the perforation diameter $D_p$, and the perforation porosity $\sigma$. The upstream resonator 20 can also define a resonant frequency, which may be a function of the same variables and can be defined by the following equations, where $f_H$ is the resonant frequency, v is the speed of sound in a gas, $\gamma$ is the adiabatic index of the gas (e.g., 1.4 for air), $P_0$ is the static pressure in the upstream annular cavity 24, and $\rho$ is the mass density of the gas:

$$f_H = \frac{v}{2\pi}\sqrt{\frac{A_{perforations}}{V_u T_n}} \quad v = \sqrt{\gamma\frac{P0}{\rho}} \quad \rho = \frac{m}{V_d}.$$

As to the downstream resonator 22, the downstream resonator 22 can be a lossless resonator (e.g., a Helmholtz resonator). In other words, the downstream resonator 22 can be configured to reflect sound waves S. The downstream resonator 22 includes a downstream annular cavity 28 that may be located external to the channel 18. The downstream annular cavity 28 may define a height $H_d$, a width $W_d$, and a volume $V_d$. In this example, the downstream annular cavity 28 essentially wraps around at least a portion of the duct 12 to define the volume $V_d$.

In some instances, the height $H_d$ of the downstream resonator 22 is smaller than the diameter of the channel 18 $D_c$, and in other instances, the height $H_d$ of the downstream resonator 22 may be greater than the diameter of the channel 18 $D_c$. The downstream resonator 22 also includes an annular opening 30 that may be configured to fluidly connect the channel 18 and the downstream annular cavity 28. The annular opening 30 may be formed as a slot within the duct body 12 and can be coplanar with the downstream annular cavity 28. The annular opening 30 may encompass the entire circumference of the duct body 12 or at least a portion of the circumference of the duct body 12. The annular opening 30 may define a width $W_o$. In some arrangements, the width $W_o$ can be substantially smaller than the width $W_d$, for example around 25% of the width $W_d$. The annular opening 30 also defines a cross-sectional area $A_o$, which is a product of the width $W_o$ of the annular opening 30 and the circumference of the annular opening 30. The annular opening 30 includes an annular neck 31 that connects the annular opening 30 to the downstream annular cavity 28. In some arrangements, the neck 31 corresponds to the thickness of the duct body 12.

The reflection of the downstream resonator 22 may be a function of the volume $V_d$, the length $L_n$, and the cross-sectional area $A_o$ of the annular opening 30. The downstream resonator 22 can also define a resonant frequency, which may be a function of the same variables and can be defined by the following equations, where $f_H$ is the resonant frequency, v is the speed of sound in a gas, $\gamma$ is the adiabatic index of the gas (e.g., 1.4 for air), $P_0$ is the static pressure in the downstream annular cavity 28, and $\rho$ is the mass density of the gas:

$$f_H = \frac{v}{2\pi}\sqrt{\frac{A_o}{V_d L_n}} \quad v = \sqrt{\gamma\frac{P0}{\rho}} \quad \rho = \frac{m}{V_d}.$$

The upstream resonator 20 and the downstream resonator 22 may work together to create resonance coupling for mitigating sound within the duct 10. In some instances, the resonant frequency of the downstream resonator 22 may be substantially equal to the resonant frequency of the upstream resonator 20. In other instances, the resonant frequency of the downstream resonator 22 may be different from the resonant frequency of the upstream resonator 20. In addition to the resonant frequency of the upstream resonator 20 and the resonant frequency of the downstream resonator 22, the resonance coupling may be a function of the distance $D_r$ between the upstream resonator 20 and the downstream resonator 22. In some arrangements, the distance $D_r$ for optimal resonance coupling is a function of the length of the sound waves traveling through the channel 18, and may be defined by the following equation, in which $\alpha$ is a constant in the range of about 0.15 to about 0.25 and $\lambda$ is the length of the sound waves traveling through the channel 18:

$$D_r = \propto\lambda.$$

Examples of absorption spectra of the duct 10 are shown in FIG. 3A, which shows the absorption of the duct 10 as a function of the frequency of the sound waves traveling within the channel 18 for three different distances $D_r$ (80 millimeters, 100 millimeters, and 120 millimeters). As shown in FIG. 3A, when the distance $D_r$ is substantially 100 millimeters, the sound absorption may be about or greater than 80%. Referring now to FIG. 3B, simulated absorption, reflection, and transmission spectra of the duct 10 are shown. The absorption spectra correspond to the amount of sound waves absorbed within the duct 10, for example, by the upstream resonator 20. The reflection spectra correspond to the amount of sound waves reflected within the duct 10, for example, by the downstream resonator 22. The transmission spectra correspond to the amount of sound waves transmitted through the duct 10, for example, from the inlet 14 to the outlet 16. As shown in FIG. 3B, the amount of sound waves transmitted through the duct 10 is substantially low, indicating the advantageous resonance coupling of the upstream resonator and the downstream resonator 22. With respect to FIG. 3B, the parameters used for simulation are $D_c$=100 mm, $D_r$=100 mm, $H_u$=15 mm, $W_u$=30 mm, $T_p$=1.5 mm, $D_p$=1 mm, $\sigma$=0.01, $H_d$=20 mm, $W_d$=60 mm, $L_n$=2 mm, and $W_o$=2 mm. High absorption (e.g., abortion over 80%) may be observed over a range of frequencies.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3B, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A duct, comprising:

a duct body defining an inlet, an outlet, and a channel connecting the inlet and the outlet, the duct body further defining:

an upstream resonator comprising an upstream annular cavity external to the channel and an annular perforated plate coplanar with the upstream annular cavity, the perforated plate defining perforations having perforation necks extending to the upstream annular cavity; and a downstream resonator comprising a downstream annular cavity external to the channel and an annular opening coplanar with the downstream annular cavity, the annular opening having an annular opening neck extending to the downstream annular cavity, wherein the length of the annular opening neck is greater than the lengths of the perforation necks.

2. The duct of claim 1, wherein the upstream resonator comprises a lossy resonator.

3. The duct of claim 1, wherein the upstream resonator defines an upstream annular cavity volume, wherein the annular perforated plate defines a plate thickness, perforation hole diameter, and perforation porosity, and wherein the absorption of the upstream resonator is a function of the upstream annular cavity volume, the plate thickness, the perforation hole diameter, and the perforation porosity.

4. The duct of claim 1, wherein the downstream resonator comprises a lossless resonator.

5. The duct of claim 1, wherein the downstream resonator comprises a downstream annular cavity volume, wherein the annular opening defines an annular neck having a cross-sectional area, and wherein the reflection of the downstream resonator is a function of the downstream annular cavity volume and the cross-sectional area of the annular neck.

6. The duct of claim 1, wherein the upstream resonator defines an upstream resonant frequency, wherein the downstream resonator defines a downstream resonant frequency, and wherein the upstream resonant frequency and the downstream resonant frequency are substantially equal.

7. The duct of claim 1, wherein the upstream resonator and the downstream resonator create resonance coupling for sound absorption, and wherein the sound absorption is a function of a distance between the upstream resonator and the downstream resonator.

8. The duct of claim 7, wherein the sound absorption is about or greater than 80% when the distance is substantially 100 millimeters.

9. The duct of claim 7, wherein the distance for optimal resonance coupling is a function of the wavelength of the sound waves traveling through the channel.

10. The duct of claim 1, wherein the duct is a muffler for a vehicle.

11. A sound mitigating system for a duct, the duct comprising a duct body defining an inlet, an outlet, and a channel connecting the inlet and the outlet, the sound mitigating system comprising:

an upstream resonator configured to be connected to the duct body external to the channel, the upstream resonator comprising an upstream annular cavity and an annular perforated plate coplanar with the upstream annular cavity, the perforated plate defining perforations having perforation necks extending to the upstream annular cavity; and a downstream resonator configured to be connected to the duct body external to the channel, the downstream resonator comprising a downstream annular cavity and an annular opening coplanar with the downstream annular cavity, the annular opening having an annular opening neck extending to the downstream annular cavity, wherein the length of the annular opening neck is greater than the lengths of the perforation necks.

12. The sound mitigating system of claim 11, wherein the upstream resonator comprises a lossy resonator.

13. The sound mitigating system of claim 11, wherein the upstream resonator defines an upstream annular cavity volume, wherein the annular perforated plate defines a plate thickness, perforation hole diameter, and perforation porosity, and wherein the absorption of the upstream resonator is a function of the upstream annular cavity volume, the plate thickness, the perforation hole diameter, and the perforation porosity.

14. The sound mitigating system of claim 11, wherein the downstream resonator comprises a lossless resonator.

15. The sound mitigating system of claim 11, wherein the downstream resonator comprises a downstream annular cavity volume, wherein the annular opening defines an annular neck having a cross-sectional area, and wherein the reflection of the downstream resonator is a function of the downstream annular cavity volume and the cross-sectional area of the annular neck.

16. The sound mitigating system of claim 11, wherein the upstream resonator defines an upstream resonant frequency, wherein the downstream resonator defines a downstream resonant frequency, and wherein the upstream resonant frequency and the downstream resonant frequency are substantially equal.

17. The sound mitigating system of claim 11, wherein the upstream resonator and the downstream resonator create resonance coupling for sound absorption, and wherein the sound absorption is a function of a distance between the upstream resonator and the downstream resonator.

18. The sound mitigating system of claim 17, wherein the sound absorption is about or greater than 80% when the distance is substantially 100 millimeters.

19. The sound mitigating system of claim 17, wherein the distance for optimal resonance coupling is a function of the wavelength of the sound waves traveling through the channel.

20. The sound mitigating system of claim 11, wherein the duct is a muffler for a vehicle.

* * * * *